US 8,583,935 B2

(12) United States Patent
Harris

(10) Patent No.: US 8,583,935 B2
(45) Date of Patent: *Nov. 12, 2013

(54) WIRELESS NETWORK HAVING MULTIPLE COMMUNICATION ALLOWANCES

(71) Applicant: Lone Star WiFi LLC, Tyler, TX (US)

(72) Inventor: Scott C. Harris, Rancho Santa Fe, CA (US)

(73) Assignee: Lone Star WiFi LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,523

(22) Filed: Jan. 23, 2013

(65) Prior Publication Data
US 2013/0148808 A1 Jun. 13, 2013

Related U.S. Application Data

(63) Continuation of application No. 13/667,690, filed on Nov. 2, 2012, which is a continuation of application No. 12/345,565, filed on Dec. 29, 2008, now Pat. No. 8,312,286, which is a continuation of application No. 10/800,472, filed on Mar. 15, 2004, now Pat. No. 7,490,348.

(60) Provisional application No. 60/454,694, filed on Mar. 17, 2003.

(51) Int. Cl.
H04L 29/06 (2006.01)

(52) U.S. Cl.
USPC .......... 713/183; 713/153; 713/155; 713/156; 713/166; 726/2; 726/4; 726/14; 726/21; 726/24; 725/29; 725/30

(58) Field of Classification Search
USPC .......... 713/153, 155, 156, 166, 183; 726/2, 4, 726/14, 21, 24; 725/29, 30
See application file for complete search history.

(56) References Cited

U.S. PATENT DOCUMENTS

| | | |
|---|---|---|
| 5,272,754 A | 12/1993 | Boerbert |
| 5,274,841 A | 12/1993 | Natarajan et al. |
| 5,659,787 A | 8/1997 | Schieltz |
| 5,678,041 A | 10/1997 | Baker et al. |
| 5,696,898 A | 12/1997 | Baker et al. |
| 5,708,780 A | 1/1998 | Levergood et al. |
| 5,745,884 A | 4/1998 | Carnegie et al. |

(Continued)

FOREIGN PATENT DOCUMENTS

| | | |
|---|---|---|
| EP | 1014624 A1 | 6/2000 |
| EP | 1018690 | 7/2000 |

(Continued)

OTHER PUBLICATIONS

Auray et al., "WiFi: An Emerging Information Society Infrastructure," Star Issue Report No. 40, Sep. 2003, 62 pages.

(Continued)

Primary Examiner — Harunur Rashid
Assistant Examiner — Gary Lavelle
(74) Attorney, Agent, or Firm — Slater & Matsil, L.L.P.

(57) ABSTRACT

Multiple levels of wireless network resource granting. A user who has an authorized key, e.g., an encryption key or a key indicating that they have paid for service, gets a first, better level of access to the network resources. One without the key is granted lesser access, e.g., less total bandwidth, less bandwidth speed, no access to files or the like.

20 Claims, 1 Drawing Sheet

(56) References Cited

U.S. PATENT DOCUMENTS

| | | |
|---|---|---|
| 5,749,075 A | 5/1998 | Toader et al. |
| 5,774,869 A | 6/1998 | Toader |
| 5,781,550 A | 7/1998 | Templin et al. |
| 5,784,566 A | 7/1998 | Viavant et al. |
| 5,802,320 A | 9/1998 | Baehr et al. |
| 5,815,574 A | 9/1998 | Fortinsky |
| 5,826,188 A | 10/1998 | Tayloe et al. |
| 5,835,727 A | 11/1998 | Wong et al. |
| 5,848,233 A | 12/1998 | Radia et al. |
| 5,850,517 A | 12/1998 | Verkler et al. |
| 5,864,683 A | 1/1999 | Boebert et al. |
| 5,872,849 A | 2/1999 | Sudia |
| 5,889,958 A | 3/1999 | Willens |
| 5,915,093 A | 6/1999 | Berlin et al. |
| 5,918,018 A | 6/1999 | Gooderum et al. |
| 5,950,195 A | 9/1999 | Stockwell et al. |
| 5,987,430 A | 11/1999 | Van Horne et al. |
| 5,987,611 A | 11/1999 | Freud |
| 6,021,433 A | 2/2000 | Payne et al. |
| 6,044,349 A | 3/2000 | Tolopka et al. |
| 6,070,243 A | 5/2000 | See et al. |
| 6,073,178 A | 6/2000 | Wong et al. |
| 6,088,451 A | 7/2000 | He et al. |
| 6,092,200 A | 7/2000 | Muniyappa et al. |
| 6,112,239 A | 8/2000 | Kenner et al. |
| 6,119,160 A | 9/2000 | Zhang et al. |
| 6,119,945 A | 9/2000 | Muller |
| 6,154,775 A | 11/2000 | Coss et al. |
| 6,158,008 A | 12/2000 | Maria et al. |
| 6,167,426 A | 12/2000 | Payne et al. |
| 6,178,512 B1 | 1/2001 | Fifield |
| 6,181,684 B1 | 1/2001 | Turcotte et al. |
| 6,185,612 B1 | 2/2001 | Jensen et al. |
| 6,219,790 B1 | 4/2001 | Lloyd et al. |
| 6,223,209 B1 | 4/2001 | Watson |
| 6,226,677 B1 | 5/2001 | Slemmer |
| 6,233,618 B1 | 5/2001 | Shannon |
| 6,233,686 B1 | 5/2001 | Zenchelsky et al. |
| 6,240,455 B1 | 5/2001 | Kamasaka et al. |
| 6,247,054 B1 | 6/2001 | Malkin |
| 6,304,973 B1 | 10/2001 | Williams |
| 6,311,275 B1 | 10/2001 | Jin et al. |
| 6,314,525 B1 | 11/2001 | Mahalingham et al. |
| 6,332,163 B1 | 12/2001 | Bowman-Amuah |
| 6,337,912 B2 | 1/2002 | Buhr et al. |
| 6,345,043 B1 | 2/2002 | Hsu |
| 6,356,937 B1 | 3/2002 | Montville et al. |
| 6,377,990 B1 | 4/2002 | Slemmer et al. |
| 6,438,125 B1 | 8/2002 | Brothers |
| 6,460,084 B1 | 10/2002 | Van Horne et al. |
| 6,463,338 B1 | 10/2002 | Neet |
| 6,463,474 B1 | 10/2002 | Fuh et al. |
| 6,466,976 B1 | 10/2002 | Alles et al. |
| 6,530,025 B1 | 3/2003 | Nakagawa et al. |
| 6,560,630 B1 | 5/2003 | Vepa et al. |
| 6,571,221 B1 | 5/2003 | Stewart et al. |
| 6,606,659 B1 | 8/2003 | Hegli et al. |
| 6,615,251 B1 | 9/2003 | Klug et al. |
| 6,636,894 B1 | 10/2003 | Short et al. |
| 6,636,968 B1 | 10/2003 | Rosner et al. |
| 6,665,536 B1 | 12/2003 | Mahany |
| 6,680,923 B1 | 1/2004 | Leon |
| 6,687,495 B2 | 2/2004 | Bhatia et al. |
| 6,687,732 B1 | 2/2004 | Bector et al. |
| 6,711,681 B1 | 3/2004 | Al-Salqan et al. |
| 6,719,200 B1 | 4/2004 | Wiebe |
| 6,721,306 B1 | 4/2004 | Farris et al. |
| 6,732,176 B1 | 5/2004 | Stewart et al. |
| 6,735,614 B1 | 5/2004 | Payne et al. |
| 6,751,221 B1 | 6/2004 | Saito et al. |
| 6,757,259 B1 | 6/2004 | Hamilton |
| 6,757,728 B2 | 6/2004 | Stebbings |
| 6,779,118 B1 | 8/2004 | Ikudome et al. |
| 6,845,106 B2 | 1/2005 | McKinnon, III et al. |
| 6,856,676 B1 | 2/2005 | Pirot et al. |
| 6,934,841 B2 | 8/2005 | Boyles et al. |
| 6,950,628 B1 | 9/2005 | Meier et al. |
| 6,950,946 B1 | 9/2005 | Droz et al. |
| 6,968,334 B2 | 11/2005 | Salmenkaita et al. |
| 6,970,927 B1 | 11/2005 | Stewart et al. |
| 7,007,093 B2 | 2/2006 | Spicer et al. |
| 5,708,780 C1 | 4/2006 | Levergood et al. |
| 6,226,677 C1 | 4/2006 | Slemmer |
| 7,028,186 B1 | 4/2006 | Stenman et al. |
| 7,035,914 B1 | 4/2006 | Payne et al. |
| 7,042,988 B2 | 5/2006 | Juitt et al. |
| 7,046,684 B2 | 5/2006 | Matsuura |
| 7,061,904 B2 | 6/2006 | Preiss et al. |
| 7,062,750 B2 | 6/2006 | Whidby et al. |
| 7,073,066 B1 | 7/2006 | Nessett |
| 7,082,535 B1 | 7/2006 | Norman et al. |
| 7,096,359 B2 | 8/2006 | Agrawal et al. |
| 7,103,313 B2 | 9/2006 | Heinonen et al. |
| 7,130,904 B2 | 10/2006 | Kitchin |
| 7,149,896 B1 | 12/2006 | Bahl et al. |
| 7,155,437 B2 | 12/2006 | Chang et al. |
| 7,173,922 B2 | 2/2007 | Beach |
| 7,173,923 B2 | 2/2007 | Beach |
| 7,177,637 B2 | 2/2007 | Liu et al. |
| 7,215,638 B1 | 5/2007 | Roberts et al. |
| 7,231,521 B2 | 6/2007 | Buddhikot et al. |
| 7,260,638 B2 | 8/2007 | Crosbie |
| 7,277,953 B2 | 10/2007 | Wils et al. |
| 7,286,848 B2 | 10/2007 | Vireday et al. |
| 7,315,823 B2 | 1/2008 | Brondrup |
| 7,316,029 B1 | 1/2008 | Parker et al. |
| 7,325,134 B2 | 1/2008 | Fascenda |
| 7,334,255 B2 | 2/2008 | Lin et al. |
| 7,362,865 B2 | 4/2008 | Karp |
| 7,373,662 B2 | 5/2008 | Foster et al. |
| 7,400,901 B2 | 7/2008 | Kostic et al. |
| 7,428,413 B2 | 9/2008 | Fink |
| 7,441,043 B1 | 10/2008 | Henry et al. |
| 7,444,669 B1 | 10/2008 | Bahl et al. |
| 7,472,191 B2 | 12/2008 | Stewart et al. |
| 7,486,628 B1 | 2/2009 | Brisebois et al. |
| 7,490,348 B1 | 2/2009 | Harris |
| 7,493,084 B2 | 2/2009 | Meier et al. |
| 7,519,740 B2 | 4/2009 | Kokkinen et al. |
| 7,523,046 B2 | 4/2009 | Colalancia et al. |
| 7,546,458 B1 | 6/2009 | Singla et al. |
| 7,574,731 B2 | 8/2009 | Fascenda |
| 7,633,909 B1 | 12/2009 | Jones et al. |
| 7,788,705 B2 | 8/2010 | Bruestle et al. |
| 7,797,530 B2 | 9/2010 | Moineau et al. |
| 7,802,292 B2 | 9/2010 | Shaw |
| 7,856,659 B2 | 12/2010 | Keeler et al. |
| 7,941,840 B2 | 5/2011 | Foster |
| 8,037,299 B2 | 10/2011 | Becker Hof |
| 8,099,321 B2 | 1/2012 | Keeler et al. |
| 8,117,639 B2 | 2/2012 | Mackinnon et al. |
| 8,196,180 B2 | 6/2012 | Keeler et al. |
| 8,312,286 B2 | 11/2012 | Harris |
| 7,035,914 C1 | 2/2013 | Payne et al. |
| 6,021,433 C1 | 3/2013 | Payne |
| 2001/0044818 A1 | 11/2001 | Liang |
| 2002/0022483 A1 | 2/2002 | Thompson et al. |
| 2002/0035699 A1 | 3/2002 | Crosbie |
| 2002/0075844 A1 | 6/2002 | Hagen |
| 2002/0141370 A1 | 10/2002 | Abrol et al. |
| 2002/0152402 A1 | 10/2002 | Tov et al. |
| 2002/0176579 A1 | 11/2002 | Deshpande et al. |
| 2002/0178365 A1 | 11/2002 | Yamaguchi |
| 2002/0188589 A1 | 12/2002 | Salmenkaita et al. |
| 2003/0003933 A1 | 1/2003 | Deshpande et al. |
| 2003/0004950 A1 | 1/2003 | Wils et al. |
| 2003/0051041 A1 | 3/2003 | Kalavade et al. |
| 2003/0079120 A1 | 4/2003 | Hearn et al. |
| 2003/0087649 A1 | 5/2003 | Bhatia et al. |
| 2003/0095663 A1 | 5/2003 | Nelson et al. |
| 2003/0140256 A1 | 7/2003 | Hauenstein et al. |
| 2003/0177237 A1 | 9/2003 | Stebbings |
| 2003/0182377 A1 | 9/2003 | Tabet et al. |
| 2003/0231610 A1 | 12/2003 | Haddad |

(56) References Cited

U.S. PATENT DOCUMENTS

| | | |
|---|---|---|
| 2004/0003060 A1 | 1/2004 | Asoh et al. |
| 2004/0004965 A1 | 1/2004 | Chen et al. |
| 2004/0073674 A1 | 4/2004 | Vergnaud et al. |
| 2004/0128558 A1 | 7/2004 | Barrett |
| 2004/0192264 A1 | 9/2004 | Liu et al. |
| 2005/0086346 A1 | 4/2005 | Meyer |
| 2005/0120202 A1 | 6/2005 | Cuellar et al. |

FOREIGN PATENT DOCUMENTS

| | | |
|---|---|---|
| EP | 1063813 A2 | 12/2000 |
| EP | 1422875 B1 | 5/2004 |
| EP | 2296348 A1 | 3/2011 |
| GB | 2350211 A | 11/2000 |
| GB | 2335767 B | 4/2003 |
| WO | WO 96/05549 | 2/1996 |
| WO | WO 96/39668 | 12/1996 |
| WO | WO 99/35865 | 7/1999 |
| WO | WO 00/72506 A1 | 11/2000 |
| WO | WO 00/72508 | 11/2000 |
| WO | WO 01/31843 A2 | 5/2001 |
| WO | WO 01/31861 A1 | 5/2001 |
| WO | WO 01/37517 A2 | 5/2001 |
| WO | WO 02/09458 A2 | 1/2002 |
| WO | WO 02/082730 A1 | 10/2002 |
| WO | WO 03/034760 A1 | 4/2003 |
| WO | WO 03/056852 A1 | 7/2003 |
| WO | WO 03/079210 A1 | 9/2003 |
| WO | WO 03/107646 A1 | 12/2003 |
| WO | WO 2004/013986 A1 | 2/2004 |
| WO | WO 2004/015958 | 2/2004 |
| WO | WO 2004/028069 A1 | 4/2004 |
| WO | WO 2004/034214 A2 | 4/2004 |
| WO | WO 2004/034229 A2 | 4/2004 |
| WO | WO 2004/036874 A1 | 4/2004 |

OTHER PUBLICATIONS

"Starwood Announces Strategic Relationship with Cisco Systems to Deliver Secure, High-Speed Internet Access and Next-Generation Services to Hotel Guests," Cisco Corp., Mar. 5, 2001, 2 pages.
Cowley, "Starwood Executive Discusses Hotel Chain's Wi-Fi Trials," InfoWorld, Jun. 17, 2003, 4 pages.
"Starwood Opens it First W Suites in Newark, Calif., A Wired (and Wireless) All-Suite Property," Press Release, Starwood Hotels & Resorts Worldwide, Inc., White Plains, New York, Jul. 25, 2000, 1 pages.
"W Hotels Now 100 Percent Wired; World's Fastest-Growing Style Brand Offers High-Speed Internet Access at all U.S. Properties," Press Release, Starwood Hotels & Resorts Worldwide, Inc., White Plains, New York, Sep. 15, 2003,1 page.
"Cisco Enables Broadband Access in Hotels, Apartments and Campuses with First Comprehensive Building Broadband Solution," Cisco Corp., Jun. 26, 2001, 3 pages.
Blau, "Marriott Makes Plans for Wi-Fi Access," PCWorld, Dec. 19, 2002, 4 pages.
Serlen, "Hilton, Marriott Go Wireless," Business Travel News, Jan. 20, 2003, 3 pages.
"Starwood and Intel Enable Wireless Internet Access in Hotels Nationwide," Press Release, Starwood Hotels & Resorts Worldwide, Inc., White Plains, New York, Feb. 2003, 1 page.
U.S. Appl. No. 60/416,583, Oct. 8, 2002, Fascenda.
U.S. Appl. No. 60/422,474, Oct. 31, 2002, Fascenda.
U.S. Appl. No. 60/477,921, Jun. 13, 2003, Fascenda.
Business Editors/High-Tech Writers, "Nomadix to License Proven Mobility Solution to the Wireless LAN Industry; Nomadix Announces First Mobility Software Package Targeted at WiFi Wireless Access Points and Infrastructure", Business Wire, NY, Nov. 27, 2001, 3 pages.
"Avaya Security in Converged Networks"; Avaya Labs and Services; Avaya—White Paper; Sep. 2002, pp. 3-21.
"Case Study: Planning and Operating a Wireless Authentication and Policy Management System at Harvard Medical School"; 2002; Harvard Medical School; Bluesocket, 12 pages.
Erasala et al. "Bluetooth technology: a strategic analysis of its role in global 3G wireless communication era"; Computer Standards & Interfaces 24, 2002, pp. 193-206.
Ross et al., "A Composable Framework for Secure Multi-Model Access to Internet Services from Post-PC Devices"; Mobile Networks and Applications 7, 2002, pp. 389-406.
Bertino et al. "Trbac: A Temporal Role-Based Access Control Model"; Aug. 2001; ACM Transactions on Information and System Security, vol. 4, No. 3, Aug. 2001, pp. 191-223.
Appenzeller et al., "User-Friendly Access Control for Public Network Ports"; Guido; Eighteenth Annual Joint Conference of the IEEE Computer and Communications Societies, vol. 3, Mar. 1999, pp. 699-707.
Weinstein et al., "Public Access Mobility LAN: Extending the Wireless Internet Into The LAN Environment"; Jun. 2002; IEEE Wireless Communications, pp. 22-30.
Pandey et al. "Exploiting User Profiles to Support Differentiated Services in Next-Generation Wireless Networks"; 2002; IEEE, pp. 295-299.
"Network Service Engine—Access in Public Spaces—White Paper"; Dec. 2, 2001; Nomadix, Inc., pp. 1-11.
"Cisco Aironet Access Point—Software Configuration Guide—340 and 350 Series Software Release 12.01T"; 2002; Cisco Systems, Inc., pp. 1-362.
Ouellet et al., "Building a Cisco Wireless LAN"; 2002; Syngress, pp. 1-501.
Nomadix, User Guide, "Universal Subscriber Gateway™", 2002; Nomadix, Inc., pp. 9-251.
Weiss, "SANS Institute InfoSec Reading Room—Wireless Networks: Security Problems and Solutions"; SANS Institute 2002, pp. 1-11.
Jacobsen et al., "The Internet Protocol Journal", vol. 5, No. 3; Sep. 2002; Cisco Systems, Inc., pp. 1-35.
Avery, "Putting 802.11b to the test"; Network World, Feb. 5, 2001, pp. 1-7.
Krishnamurthy et al., "Security Architecture for Wireless Residential Networks"; Telecommunications Program, Department of Information Science & Telecommunications, University of Pittsburgh, 2000, pp. 1960-1966.
Hannikainen et al., "Trends in personal wireless data communications"; Digital and Computer Systems Laboratory, Tampere University of Technology, Computer Communications 25 (2002), pp. 84-99.
Henry, "Wifi: What's Next?"; IEEE Communications Magazine, Dec. 2, 2002, pp. 66-72.
Baker et al. "Local Control over Filtered WWW Access"; Fourth International World Wide Web Conference: Dec. 11-14, 1995, Boston, Massachusetts, pp. 1-9.
"Product Announcement—Cisco 2509-2512 Series Access Servers"; 1995; Cisco Systems, Inc., pp. 1-8.
Leveridge, "CampusWorld and BT's on-line education services"; BT Technol. Journal, vol. 15, No. 2, Apr. 1997, pp. 126-131.
Poger et al., "Secure Public Internet Access Handler SPINACH"; Dec. 1997; USENIX Symposium on Internet Technologies and Systems, 12 pages.
Carl-Mitchell et al., "Using ARP to Implement Transparent Subnet Gateways"; Oct. 1987; Network Working Group, pp. 1-8.
Housel et al., "WebExpress: A client/intercept based system for optimizing Web browsing in a wireless environment"; 1998; Proceedings of the Second Annual International Conference on Mobile Networks and Applications, pp. 419-431.
Cole, "Using Bluestem for Web User Authentication and Access Control of Library Resources"; Authentication and Authorization , Part 4, 1997; Library bHi Tech, Issue 57-58—15:1-2, pp. 58-71.
Max Radius Configuration Guide; Nov. 1998; Ascend Communications, Inc., 506 pages.
Thomson et al., "Proxy Servers and Databases for Managing Web-based Information"; 1997; Department of Computer Science, University of Saskatchewan; pp. 133-146.
"ChoiceNet Administrator's Guide"; Livingston Enterprises, Inc., Jan. 1997, pp. Preface (xi-xv), 1-1 thru 5-15 and A-1 thru D; 88 pages.

(56) References Cited

OTHER PUBLICATIONS

Prasad, "Security Architecture for Wireless LANs: Corporate & Public Environment"; Wireless Communications & Networking Division, Lucent Technologies, 2000; IEEE, pp. 283-287.
Racherla et al., "Security and Privacy Issues in Wireless and Mobile Computing"; 2000 IEEE; pp. 509-513.
Luo et al., "Internet Roaming: A WLAN/3G Integration System for Enterprises"; Wireless and Mobile.Communications II, Proceedings of SPIE vol. 4911, 2002, pp. 154-164.
Lucky "Cannot Connect"; www.boblucky.com/reflect/jan02.htm, IEEE Spectrum Magazine, Jan. 2002, 4 pages.
Blau, "3G: More delays, uncertainty rock wireless Europe"; Aug. 12, 2002; IDG News Service, 2 pages.
Campbell et al., "Comparison of IP Micromobility Protocols"; Feb. 2002; IEEE Wireless Communications, pp. 72-82.
Gill, "Study: Broadband Adoption on the Rise"; Jun. 24, 2002; E-Commerce Times, pp. 1-2.
Convery et al., "Cisco SAFE: Wireless LAN Security in Depth"; 1992; Cisco Systems, Inc., pp. 1-76.
Fluhrer et al., "Weaknesses in the Key Scheduling Algorithm of RC4"; Cisco Systems, Inc., 2001, pp. 1-24.
"Cisco—Cisco Aironet Wireless LAN Security Overview"; 1992; Cisco Systems, Inc., pp. 1-13.
Miller et al., "Home Networking with Universal Plug and Play"; Dec. 2001; IEEE Communications Magazine, pp. 104-109.
In Hot Pursuit Of The Wi-Fi Wave: Can Boingo Wireless, from the founder of EarthLink, turn hot spots into money?; Apr. 29, 2002; Arlene Weintraub; Business Week, 2 pages.
"All Net, All High-Speed Connections, Just About Anywhere: Wi-Fi"; Apr. 29, 2002; Roger O. Crockett, Heather Green, Andy Reinhardt, Jay Greene; Business Week, 6 pages.
"You Say You Want A Wireless Revolution?"; Apr. 29, 2002; Heather Green; Business Week, 2 pages.
Garfinkel et al., "Practical Unix & Internet Security"; 1996; O'Reilly & Associates, Inc., TOC, preface, pp. 1-985.
Geier "Understanding Public Key Cryptography"; Jan. 21, 2003; Wifi Planet, 2 pages.
Kane "WiFi getting new security standard"; Oct. 31, 2002; CNET News, 6 pages.
Chapman et al. "Building Internet Firewalls"; 1995; O'Reilly & Associates, Inc., pp. 1-543.
"Cisco's PIX Firewall Series and Stateful Firewall Security"; 1997; Cisco Systems, Inc., TOC, preface, pp. 1-12.
"Wi-Fi Alliance Announces First Wi-Fi Certified 5 GHz IEEE 802.11a and Dual Band Products"; Jan. 16, 2003;.Wi-Fi Alliance, 2 pages.
Excerpts of Microsoft Computer Dictionary 4th ed.; 1999; Microsoft Corporation, 4 pages.
"Introducing Boingo Wireless"; 2002; Boingo Wireless, Inc., 1 page.
Osborn et al., "Configuring role-Based Access Control to Enforce Mandatory and Discretionary Access Control Policies", ACM Transactions on Information and System Security, vol. 3, No. 2, May 2000, pp. 85-106.
Business Editors/High-Tech Writers, "Vernier Networks Enhances Its Enterprise-Class Features for Securing Mission-Critical WLANs", Vernier Networks System, Dec. 2002; 4 pages.
BARWAN website, Index of /~randy/Daedalus/BARWAN, Bay Area Research Wireless Access Network, Jun. 12, 1995, last accessed on Jun. 20, 2013, pp. 1-158.
Salli et al., "Security Design for a New Wireless Local Area Network TUTWLAN", 1988 IEEE, Tampere University of Technology, Signal Processing Laboratory, Nokia Mobile Phones, Wireless Data, pp. 1540-1544.
Bahl et al., "PAWNs: Satisfying the Need for Ubiquitous Secure Connectivity and Location Services", IEEE Wireless Communications, Feb. 2002, pp. 40-48.
Schmid et al., "An Access Control Architecture for Microcellular Wireless IPv6 Networks", Distributed Multimedia Research Group Computing Department, Lancaster University, UK, Nov. 2001, 10 pages.

Acharya et al., "ts-PWLAN: A Value-Add System for Providing Tiered Wireless Services in Public Hot-spots", IBM Research Report, RC22516 (WO205-211), May 30, 2002, pp. 1-11.
Kagal et al., "Trust-Based Security in Pervasive Computing Environments", Communications, Computer, Dec. 2001, pp. 2-5.
Bahl et al., "The CHOICE Network: Broadband Wireless Internet Access in Public Places", Technical Report MSR-TR-2000-21, Feb. 2000, Microsoft Research, Microsoft Corporation, Redmond WA, pp. 1-13.
Brewer et al., "A Network Architecture for Heterogeneous Mobile Computing", University of California at Berkeley, Aug. 19, 1998, pp. 1-24.
"Defendant's Joint Invalidity Contentions", U.S. District Court Eastern District of Texas, Tyler Division, Lone Start Wifi LLC, Civil Action: 6:12cv957, dated May 24, 2013, 30 pages.
Exhibit A1 of Defendant's Joint Invalidity Contentions, "Claim Chart Comparing U.S. Patent No. 7,490,348 (the "348 Patent") to U.S. Pat. App. Pub. No. 2002/0075844 ("Hagen")", Civil Action: 6:12cv957, dated May 24, 2013, 70 pages.
Exhibit A2 of Defendant's Joint Invalidity Contentions, "Claim Chart Comparing U.S. Patent No. 7,490,348 (the "348 Patent") to U.S. Pat. No. 7,177,637 ("Liu")", Civil Action: 6:12cv957, dated May 24, 2013, 36 pages.
Exhibit A3 of Defendant's Joint Invalidity Contentions, "Claim Chart Comparing U.S. Patent No. 7,490,348 (the "348 Patent") to U.S. Pat. No. 7,362,865 ("Karp") to U.S. Pat. No. 7,177,637 ("Liu")", Civil Action: 6:12cv957, dated May 24, 2013, 35 pages.
Exhibit A4 of Defendant's Joint Invalidity Contentions, "Claim Chart Comparing U.S. Patent No. 7,490,348 (the "348.Patent") to IBM Research Report ts-PWLAN: A Value-add System for Providing Tiered Wireless Services in Public Hot Spots, RC22516 (W0205-211) ("ts-PWLAN")", Civil Action: 6:12cv957, dated May 24, 2013, 68 pages.
Exhibit A5 of Defendant's Joint Invalidity Contentions, "Claim Chart Comparing U.S. Patent No. 7,490,348 (the "348 Patent") to International Pub. No. WO 2004/015958 ("Bruestle")", Civil Action: 6:12cv957, dated May 24, 2013, 48 pages.
Exhibit A6 of Defendant's Joint Invalidity Contentions, "Claim Chart Comparing U.S. Patent No. 7,490,348 (the "348 Patent") to U.S. Pat. App. Pub. No. 2004/0003060 ("Asoh")", Civil Action: 6:12cv957, dated May 24, 2013, 79 pages.
Exhibit A7 of Defendant's Joint Invalidity Contentions, "Claim Chart Comparing U.S. Patent No. 7,490,348 (the "348 Patent") to U.S. Pat. App. Pub. No. 2003/0140256 ("Hauenstein")", Civil Action: 6:12cv957, dated May 24, 2013, 36 pages.
Exhibit A8 of Defendant's Joint Invalidity Contentions, "Claim Chart Comparing U.S. Patent No. 7,490,348 (the "348 Patent") to U.S. Pat. No. 7,042,988 ("Juitt")", Civil Action: 6:12cv957, dated May 24, 2013, 54 pages.
Exhibit A11 of Defendant's Joint Invalidity Contentions, "Claim Chart Comparing U.S. Patent No. 7,490,348 (the "348 Patent") "PAWNs: Satisfying the need for ubiquitous secure connectivity and location services" by Paramvir Bahl et al. ("PAWNs")", Civil Action: 6:12cv957, dated May 24, 2013, 54 pages.
Exhibit A12 of Defendant's Joint Invalidity Contentions, "Claim Chart Comparing U.S. Patent No. 7,490,348 (the "348 Patent") to "The CHOICE Network: Broadband Wireless Internet Access in Public Places" by Victor Bahl et al. ("CHOICE")", Civil Action: 6:12cv957, dated May 24, 2013, 63 pages.
Exhibit A13 of Defendant's Joint Invalidity Contentions, "Claim Chart Comparing U.S. Patent No. 7,490,348 (the "348 Patent") to WO 02/09458 A2 ("Wakimura")", Civil Action: 6:12cv957, dated May 24, 2013, 66 pages.
Exhibit A14 of Defendant's Joint Invalidity Contentions, "Claim Chart Comparing U.S. Patent No. 7,490,348 (the "348.Patent") to Avaya—Security in Converged Networks ("Avaya")", Civil Action: 6:12cv957, dated May 24, 2013, 67 pages.
Exhibit A15 of Defendant's Joint Invalidity Contentions, "Claim Chart Comparing U.S. Patent No. 7,490,348 (the "348 Patent") to An Access Control Architecture for Microcellular Wireless IPv6 Networks, by S. Schmid, et al. (LCN 2001, 26th Annual IEEE Conference on Local Computer Networks, Nov. 14-16, 2001) ("Schmid")", Civil Action: 6:12cv957, dated May 24, 2013, 41 pages.

(56) References Cited

OTHER PUBLICATIONS

Exhibit A16 of Defendant's Joint Invalidity Contentions, "Claim Chart Comparing U.S. Patent No. 7,490,348 (the "348 Patent") to U.S. Pat. No. 6,665,536 ("Mahany")", Civil Action: 6:12cv957, dated May 24, 2013, 118 pages.
Exhibit A17 of Defendant's Joint Invalidity Contentions, "Claim Chart Comparing U.S. Patent No. 7,490,348 (the "348 Patent") to U.S. Pat. No. 6,950,628 ("Meier")", Civil Action: 6:12cv957, dated May 24, 2013, 56 pages.
Exhibit A18 of Defendant's Joint Invalidity Contentions, "Claim Chart Comparing U.S. Patent No. 7,490,348 (the "348 Patent") to WO 03/079210 ("Acharya")", Civil Action: 6:12cv957, dated May 24, 2013, 87 pages.
Exhibit A19 of Defendant's Joint Invalidity Contentions, "Claim Chart Comparing U.S. Patent No. 7,490,348 (the "348 Patent") to U.S. Pat. No. 7,546,458 B1 ("Singla")", Civil Action: 6:12cv957, dated May 24, 2013, 54 pages.
Exhibit A20 of Defendant's Joint Invalidity Contentions, "Claim Chart Comparing U.S. Patent No. 7,490,348 (the "348 Patent") to "Security Architecture for Wireless Residential Networks" by Prashant Krishnamurthy et al. ("Krishnamurthy")", Civil Action: 6:12cv957, dated May 24, 2013, 52 pages.
Exhibit A21 of Defendant's Joint Invalidity Contentions, Claim Chart Comparing U.S. Patent No. 7,490,348 (the "348 Patent") to U.S. Pat. No. 7,173,922 ("Beach"), Civil Action: 6:12cv957, dated May 24, 2013, 60 pages.
Exhibit A22 of Defendant's Joint Invalidity Contentions, "Claim Chart Comparing U.S. Patent No. 7,490,348 (the "348 Patent") to "WiFi: what's next!," Henry, P., Hui Luo (Communications Magazine, IEEE, vol. 40, No. 12, IEEE Digital Object Identifier: 10.1109/MCOM.2002.11b6162 Publication 2002) pp. 66-72 ("Henry")", Civil Action: 6:12cv957, dated May 24, 2013, 49 pages.
Exhibit A23 of Defendant's Joint Invalidity Contentions, "Claim Chart Comparing U.S. Patent No. 7,490,348 (the "348 Patent") to U.S. Pat. No. 7,574,731 ("Fascenda")", Civil Action: 6:12cv957, dated May 24, 2013, 59 pages.
Exhibit A24 of Defendant's Joint Invalidity Contentions, "Claim Chart Comparing U.S. Patent No. 7,490,348 (the "348 Patent") to Security Architecture for Wireless LANs: Corporate & Public Environment, Anand R. Prasad, et al. (2000 IEEE $51^{st}$ Vehicular Technology Conference (VTC 2000 vol. 1)) ("Prasad")", Civil Action: 6:12cv957, dated May 24, 2013, 43 pages.
Exhibit A25 of Defendant's Joint Invalidity Contentions, "Claim Chart Comparing U.S. Patent No. 7,490,348 (the "348 Patent") to Aironet Access Point Software Configuration Guide ("Aironet")", Civil Action: 6:12cv957, dated May 24, 2013, 19 pages.
Exhibit A26 of Defendant's Joint Invalidity Contentions, "Claim Chart Comparing U.S. Patent No. 7,490,348 (the "348 Patent") to Aironet 340/350", Civil Action: 6:12cv957, dated May 24, 2013, 19 pages.
Exhibit A27 of Defendant's Joint Invalidity Contentions, "Claim Chart Comparing U.S. Patent No. 7,490,348 (the "348 Patent") to Nomadix Universal Subscriber Gateway User's Guide ("USG User's Guide")", Civil Action: 6:12cv957, dated May 24, 2013, 19 pages.
Exhibit A28 of Defendant's Joint Invalidity Contentions, "Claim Chart Comparing U.S. Patent No. 7,490,348 (the "348 Patent") to Nomadix Universal Subscriber Gateway ("USG")", Civil Action: 6:12cv957, dated May 24, 2013, 19 pages.
Exhibit B1 of Defendant's Joint Invalidity Contentions, "Claim Chart Comparing U.S. Patent No. 8,312,286 (the "286 Patent") to U.S. Pat. App. Pub. No. 2002/0075844 ("Hagen")", Civil Action: 6:12cv957, dated May 24, 2013, 145 pages.
Exhibit B2 of Defendant's Joint Invalidity Contentions, "Claim Chart Comparing U.S. Patent No. 8,312,286 (the "286 Patent") to U.S. Pat. No. 7,177,637 ("Liu")", Civil Action: 6:12cv957, dated May 24, 2013, 65 pages.
Exhibit B3 of Defendant's Joint Invalidity Contentions, "Claim Chart Comparing U.S. Patent No. 8,312,286 (the "286 Patent") to U.S. Pat. No. 7,362,865 ("Karp")", Civil Action: 6:12cv957, dated May 24, 2013, 64 pages.
Exhibit B4 of Defendant's Joint Invalidity Contentions, "Claim Chart Comparing U.S. Patent No. 8,312,286 (the "286 Patent") to IBM Research Report ts-PWLAN: A Value-add System for Providing Tiered Wireless Services in Public Hot Spots, RC22516 (W0205-211) ("ts-PWLAN")", Civil Action: 6:12cv957, dated May 24, 2013, 95 pages.
Exhibit B5 of Defendant's Joint Invalidity Contentions, "Claim Chart Comparing U.S. Patent No. 8,312,286 (the "286 Patent") to International Pub. No. WO 2004/015958 ("Bruestle")", Civil Action: 6:12cv957, dated May 24, 2013, 116 pages.
Exhibit B6 of Defendant's Joint Invalidity Contentions, "Claim Chart Comparing U.S. Patent No. 8,312,286 (the "286 Patent") to U.S. Pat. App. Pub. No. 2004/0003060 ("Asoh")", Civil Action: 6:12cv957, dated May 24, 2013, 225 pages.
Exhibit B7 of Defendant's Joint Invalidity Contentions, "Claim Chart Comparing U.S. Patent No. 8,312,286 (the "286 Patent") to U.S. Pat. App. Pub. No. 2003/0140256 ("Hauenstein")", Civil Action: 6:12cv957, dated May 24, 2013, 87 pages.
Exhibit B9 of Defendant's Joint Invalidity Contentions, "Claim Chart Comparing U.S. Patent No. 8,312,286 (the "286 Patent") to U.S. Pat. No. 6,636,894 ("Short")", Civil Action: 6:12cv957, dated May 24, 2013, 190 pages.
Exhibit B10 of Defendant's Joint Invalidity Contentions, "Claim Chart Comparing U.S. Patent No. 8,312,286 (the "286 Patent") to U.S. Pat. No. 6,970,927 ("Stewart")", Civil Action: 6:12cv957, dated May 24, 2013, 200 pages.
Exhibit B11 of Defendant's Joint Invalidity Contentions, "Claim Chart Comparing U.S. Patent No. 8,312,286 (the "286 Patent") to "PAWNs: Satisfying the need for ubiquitous secure connectivity and location services" by Paramvir Bahl et al. ("PAWNs")", Civil Action: 6:12cv957, dated May 24, 2013, 91 pages.
Exhibit B12 of Defendant's Joint Invalidity Contentions, "Claim Chart Comparing U.S. Patent No. 8,312,286 (the "286 Patent") to "The CHOICE Network: Broadband Wireless Internet Access in Public Places" by Victor Bahl et al. ("CHOICE")", Civil Action: 6:12cv957, dated May 24, 2013, 103 pages.
Exhibit B13 of Defendant's Joint Invalidity Contentions, "Claim Chart Comparing U.S. Patent No. 8,312,286 (the "286 Patent") to WO 02/09458 A2 ("Wakimura")", Civil Action: 6:12cv957, dated May 24, 2013, 180 pages.
Exhibit B14 of Defendant's Joint Invalidity Contentions, "Claim Chart Comparing U.S. Patent No. 8,312,286 (the "286 Patent") to Avaya—Security in Converged Networks ("Avaya")", Civil Action: 6:12cv957, dated May 24, 2013, 196 pages.
Exhibit B15 of Defendant's Joint Invalidity Contentions, "Claim Chart Comparing U.S. Patent No. 8,312,286 (the "286 Patent") to An Access Control Architecture for Microcellular Wireless IPv6 Networks, by S. Schmid, et al. (LCN 2001,.26th Annual IEEE Conference on Local Computer Networks, Nov. 14-16, 2001) ("Schmid")", Civil Action: 6:12cv957, dated May 24, 2013, 75 pages.
Exhibit B16 of Defendant's Joint Invalidity Contentions, "Claim Chart Comparing U.S. Patent No. 8,312,286 (the "286 Patent") to U.S. Pat. No. 6,665,536 ("Mahany")", Civil Action: 6:12cv957, dated May 24, 2013, 234 pages.
Exhibit B17 of Defendant's Joint Invalidity Contentions, "Claim Chart Comparing U.S. Patent No. 8,312,286 (the "286 Patent") to U.S. Pat. No. 6,950,628 ("Meier")", Civil Action: 6:12cv957, dated May 24, 2013, 76 pages.
Exhibit B18 of Defendant's Joint Invalidity Contentions, "Claim Chart Comparing U.S. Patent No. 8,312,286 (the "286 Patent") to WO 03/079210 ("Acharya")", Civil Action: 6:12cv957, dated May 24, 2013, 158 pages.
Exhibit B19 of Defendant's Joint Invalidity Contentions, "Claim Chart Comparing U.S. Patent No. 8,312,286 (the "286 Patent") to US 7,546,458 ("Singla")", Civil Action: 6:12cv957, dated May 24, 2013, 117 pages.
Exhibit B20 of Defendant's Joint Invalidity Contentions, "Claim Chart Comparing U.S. Patent No. 8,312,286 (the "286 Patent") to "Security Architecture for Wireless Residential Networks" by Prashant Krishnamurthy et al. (Krishnamurthy)", Civil Action: 6:12cv957, dated May 24, 2013, 88 pages.

(56) References Cited

OTHER PUBLICATIONS

Exhibit B21 of Defendant's Joint Invalidity Contentions, "Claim Chart Comparing U.S. Patent No. 8,312,286 (the "286 Patent") to U.S. Pat. No. 7,173,922 ("Beach")", Civil Action: 6:12cv957, dated May 24, 2013, 181 pages.
Exhibit B22 of Defendant's Joint Invalidity Contentions, "Claim Chart Comparing U.S. Patent No. 8,312,286 (the "286 Patent") "WiFi: what's nect!," Henry, P., Hui Luo (Communications Magazine, IEEE, vol. 40, No. 12, IEEE Digital Object Identifier: 10.1109/MCOM.2002.1106162 Publication 2002) pp. 66-72 ("Henry")", Civil Action: 6:12cv957, dated May 24, 2013, 102 pages.
Exhibit B23 of Defendant's Joint Invalidity Contentions, "Claim Chart Comparing U.S. Patent No. 8,312,286 (the "286 Patent") to U.S. Pat. No. 6,950,628 ("Fascenda")", Civil Action: 6:12cv957, dated May 24, 2013, 118 pages.
Exhibit B24 of Defendant's Joint Invalidity Contentions, "Claim Chart Comparing U.S. Patent No. 8,312,286 (the "286 Patent") to Security Architecture for Wireless LANs: Corporate & Public Environment, Anand R. Prasad, et al. (2000 IEEE 51$^{st}$ Vehicular Technology Conference (VTC 2000 vol. 1) ("Prasad")", Civil Action: 6:12cv957, dated May 24, 2013, 118 pages.
Exhibit B25 of Defendant's Joint Invalidity Contentions, "Claim Chart Comparing U.S. Patent No. 8,312,286 (the "286 Patent") to Aironet Access Point Software Configuration Guide ("Aironet")", Civil Action: 6:12cv957, dated May 24, 2013, 24 pages.
Exhibit B26 of Defendant's Joint Invalidity Contentions, "Claim Chart Comparing U.S. Patent No. 8,312,286 (the "286 Patent") to Aironet 340/350", Civil Action: 6:12cv957, dated May 24, 2013, 24 pages.
Exhibit B27 of Defendant's Joint Invalidity Contentions, "Claim Chart Comparing U.S. Patent No. 8,312,286 (the "286 Patent") to Nomadix Universal Subscriber Gateway User's Guide ("USG User's Guide")", Civil Action: 6:12cv957, dated May 24, 2013, 23 pages.
Exhibit B28 of Defendant's Joint Invalidity Contentions, "Claim Chart Comparing U.S. Patent No. 8,312,286 (the "286 Patent") to Nomadix Universal Subscriber Gateway ("USG")", Civil Action: 6:12cv957, dated May 24, 2013, 23 pages.
Exhibit C of Defendant's Joint Invalidity Contentions, "Exemplary Obviousness Chart for U.S. Patent No. 7,490,348 (the "348 Patent")", Civil Action: 6:12cv957, dated May 24, 2013, 423 pages.
Press Release, "Wi-Fi Alliance Begins Wi-Fi Certification of 5 GHz IEEE 802.11a Products", Wi-Fi Alliance, Oct. 9, 2002, 1 page.

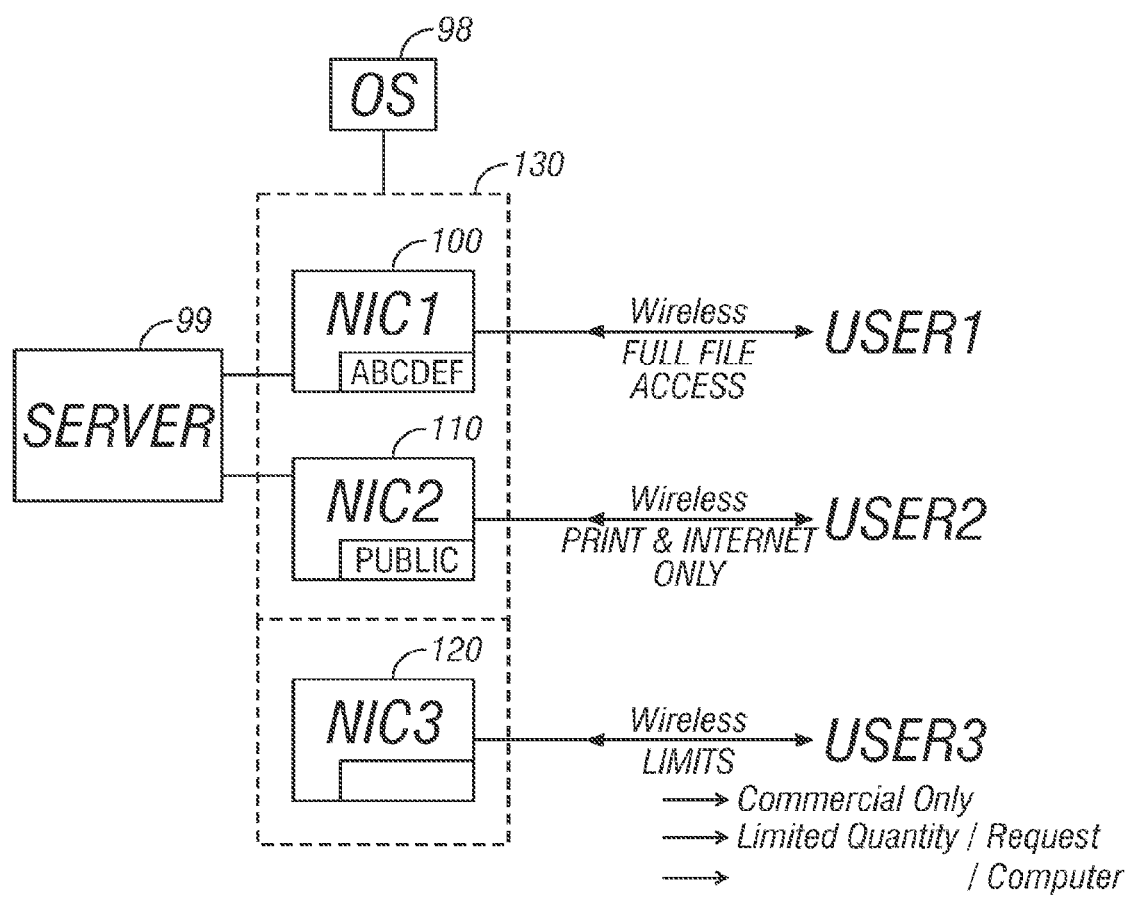

WIRELESS NETWORK HAVING MULTIPLE COMMUNICATION ALLOWANCES

This application is a continuation of U.S. patent application Ser. No. 13/667,690, filed on Nov. 2, 2012, and entitled "Wireless Network Having Multiple Communication Allowances", which is a continuation of U.S. patent application Ser. No. 12/345,565, filed on Dec. 29, 2008, now U.S. Pat. No. 8,312,286, and entitled "Wireless Network Having Multiple Communication Allowances", which is a continuation of U.S. patent application Ser. No. 10/800,472, filed on Mar. 15, 2004, now U.S. Pat. No. 7,490,348, and entitled "Wireless Network Having Multiple Communication Allowances", which claims priority to U.S. Provisional Patent Application No. 60/454,694, filed Mar. 14, 2003, and entitled "Wireless Network Having Multiple Communication Allowances", each of which applications are hereby incorporated herein by reference.

FIELD OF INVENTION

Wireless networks are well-known, and may be based, for example, on the 802.11 standard. Because the contents of the wireless network can be received by anyone with wireless access, security may be achieved through encryption of the stream. Anyone with an encryption code can tap into the network. Those without the encryption code, however, simply cannot decode the wireless stream. In addition, standard network protocols may be used, so that not only the encryption code, but also a network login, is necessary.

SUMMARY

The present application describes a wireless network, defining a plurality of different classes of service, where the different classes of service include at least a first class of service that includes a first set of permissions for access to resources, and a second class of service which includes a second set of permissions of access to resources.

BRIEF DESCRIPTION OF THE DRAWINGS

These and other aspects will now be described in detail with reference to the accompanying drawings, in which:

FIG. 1 shows a basic diagram of the networks described herein.

DETAILED DESCRIPTION

Wireless networks have been used for other things besides secure file transfer. For example, Internet Cafes, and "wireless hot spots" may include the capability of communication to a user's personal laptop which is equipped with a wireless card. This may use a network key for the encryption of the word "public", or a network key which is given to users who pay for the service or pay for a drink or food, or without any network key at all. Certain areas such as hotel rooms are often wireless enabled. However, the communication is typically or totally on, or totally off; that is either the user is allowed to receive wireless Internet, or the user is blocked from all communications.

The present system teaches a network with multiple levels of capability, depending on the access credentials possessed by the user. FIG. 1 shows this being carried out using multiple network cards or NICs. However, the same effect can be obtained with a single NIC. Preferably the network cards are wireless, using one of the features of IEEE 802.11 wireless communication protocols.

Different classes of users may be assigned. The first class of users, shown as user 1, are allowed file access to files and information from the server. These users may be given the encryption key, here for the first NIC 100 here shown as ABCDEF. These users may be allowed the highest level of access to resources. As conventional users who have the complete set of credentials, they are allowed unlimited upload and download, and full file access (that is allowed to non-administrator users). In addition, these users may be allowed the maximum upload and download speeds which is given to network users, and to receive all different kinds of Internet and files from all sources.

For example, the amount of access which is provided to these users may be assigned by the operating system which drives the NICS. For example, if Windows XP is used as the operating system, it may assign NIC 100 with unlimited file access.

A second class of users shown as user 2 do not have the credentials, here the encryption key, for the network card 100, and hence use the encryption key "public" and thereby can only communicate with the network card No. 2 shown as 110. Alternatively, these same users may communicate using no encryption key at all. The network card 110 allows only some subset of the operations that are allowed by the network card 100. For example, the user 2 may receive Internet only, and no file access. They may be allowed to print. In addition, the upload and download speeds may be limited or severely limited; for example, the Internet may be limited to 1 M download speeds and 100K of upload speed.

This system as described above may be usable in an office environment. For example, users who are actually members of the office obtain file access, while visitors only receive print and Internet access.

Another contemplated use is in pay-for-Internet use. The user 1 may pay a higher fee than the user 2. For example, user 2 may pay only for limited Internet, while user 1 may pay for access to resources such as video over IP, and higher download speeds from the Internet.

In addition, a third class of users shown as user 3 may be defined. These users communication only to NIC 120. Note that while this describes users 1, 2 and 3, any subset of these users may be used, for example a system may be configured which only communicates with user 1 and user 3. The NIC No. 3 is shown as having no encryption code whatsoever. User 3 is limited even further. User 3 may receive only commercial parts of the Internet. In the office environment, this may limit the Internet to web pages describing the office and/or certain intranet sites. In a pay for internet environment, this may describe the "free" user, who may only receive certain content. User 3 may also receive a severely restricted bandwidth and/or only a limited quantity of information. For example, the user 3 may be assigned a token which allows them only to receive for example total of 1 megabytes of download and only to upload 100 Kilobytes of upload. This even further limits the user 3.

As described above, the different users in their different classes have different levels of file access, and resource access, resource speed and resource amount.

FIG. 1 shows this being carried out with three different network cards over the same airspace. Alternatively, the three different networks may be carried out as part of a single network card; shown as network card 130. For example, this may include three network resources which operate on the single card. Alternatively, the three different kinds of resources may be carried out in software, for example this may be carried out by three different network resource allowances within the software that runs the network card or within the server 99.

Other implementations are within the disclosed embodiment.

What is claimed is:

1. A network transmitting system, comprising:
   a first networking device, transmitting an unencrypted first wireless network stream from a first location, said first wireless network stream requiring a first key in order to access content in said first wireless network stream, and said first wireless network stream, when accessed using said first key, providing a first level of access to network resources;
   wherein said first level of access to network resources provided by said first wireless network stream does not include access to information on a local area network server, and allows access to one or more specific webpages without said first key but does not allow access to a subset of webpages without said first key, and allows access to additional webpages including said subset of webpages with said first key;
   a second networking device, transmitting an unencrypted second wireless network stream from an area overlapping in the same space as the first networking device, said second wireless network stream controlling access with a second key, and providing a second level of access to network resources in order to access said second wireless network stream,
   wherein said second level of access to network resources provided by said second wireless network stream does not include access to the information on the local area network server, and allows access to the internet including said subset of webpages with said second key; and
   third networking device, transmitting an unencrypted first wired network stream to an area overlapping in the same space as the first networking device, said first wired network stream providing the first level of access to network resources when accessed with a third key.

2. A system as in claim 1, wherein said first, second and third networking devices are separate devices which are physically in a single housing.

3. A system as in claim 1, wherein said first level of access also provides internet access.

4. A system as in claim 3, wherein said first networking device connects to a printer and allows access to a printer.

5. A system as in claim 1, wherein said first key is provided without payment for a service.

6. A system as in claim 1, wherein said first, second, and third keys are different.

7. A system as in claim 1, wherein said first, second, and third networking devices includes keys that are different for different users.

8. A system as in claim 1, wherein said unencrypted first wireless networking stream and said unencrypted second wireless networking stream have different names.

9. A system as in claim 4, further comprising a fourth networking device, transmitting a second wired network stream, said second wired network stream providing access to video over IP over said second wired network stream.

10. A system as in claim 9, further comprising a fifth networking device, transmitting a third wired network stream, said third wired network stream providing a third level of access that does not transmit video over IP and provides access to the Internet over said third wired network stream.

11. A system as in claim 10, wherein said first, second, and third levels of access provide internet access through the same connection.

12. A network transmitting system, comprising:
   a first networking device, transmitting an unencrypted first wireless network stream from a first location, said first wireless network stream requiring a first key in order to access content in said first wireless network stream, and said first wireless network stream, when accessed using said first key, providing a first level of access to network resources;
   wherein said first level of access to network resources provided by said first wireless network stream does not include access to information on a local server, and allows access to one or more specific webpages without said first key but does not allow access to a subset of webpages without said first key, and allows access to additional webpages including said subset of webpages with said first key;
   a second networking device, transmitting an unencrypted first wired network stream to an area overlapping in the same space as the first networking device, said first wired network stream providing the first level of access to network resources when accessed using said first key;
   a third networking device, transmitting an unencrypted second wireless network stream from an area overlapping the first networking device, said second wireless network stream controlling access with a second key, and providing a second level of access to network resources in order to access said second wireless network stream,
   wherein said second level of access to network resources provided by said second wireless network stream does not include access to the information on the local server, and allows access to the internet including said subset of webpages with said second key; and
   a fourth networking device, transmitting an unencrypted second wired network stream to an area overlapping in the same space as the third networking device, said second wired network stream providing the second level of access to network resources when accessed using said second key.

13. A system as in claim 12, wherein said first and second networking devices, and said third, and fourth networking devices are separate devices which are physically in separate housings.

14. A system as in claim 12, wherein said first level of access also provides internet access.

15. A system as in claim 14, wherein said first and second networking devices are connected to a printer and said first level of access allows access to a printer.

16. A system as in claim 12, wherein said first and second networking devices include keys that are different for different users.

17. A system as in claim 12, wherein said unencrypted first wireless networking stream and said unencrypted second wireless networking stream have different names.

18. A system as in claim 12, further comprising:
   a fifth networking device, transmitting a third wired network stream, said third wired network stream providing access to video over IP over said third wired network stream; and
   a sixth networking device, transmitting a fourth wired network stream, said fourth wired network stream providing a third level of access that does not provide access to video over IP and provides access to the Internet over said fourth wired network stream.

19. A system as in claim 18, wherein said first, second, and third levels of access provide internet access through the same connection.

20. A system as in claim 12, further comprising a fifth networking device, transmitting a first encrypted wireless network stream from a first location, said first encrypted wireless network stream being encrypted with a third key for sending and receiving encrypted information, and said first encrypted wireless network stream providing a third level of access to network resources using said first encrypted wireless network stream wherein said third level of access to network resources includes access to information on a computer located near the fifth networking device.

* * * * *